United States Patent [19]

Galtier et al.

[11] Patent Number: 4,993,730
[45] Date of Patent: Feb. 19, 1991

[54] REAR-STEERING CONTROL DEVICE FOR AUTOMOTIVE VEHICLE WITH FOUR-WHEEL STEERING

[75] Inventors: Lucien Galtier, Morsang sur Orge; Michel Langlois, Montigny le Bretonneux; André Barthelemy, Saint-Remy-les-Chevreuse, all of France

[73] Assignees: Automobiles Peugeout, Paris; Automobiles Citroen, Neuilly sur Seine, both of France

[21] Appl. No.: 475,317

[22] Filed: Feb. 5, 1990

[30] Foreign Application Priority Data

Feb. 2, 1989 [FR] France .................... 89 01632

[51] Int. Cl.⁵ .................................... B62D 7/15
[52] U.S. Cl. ................................. 280/91; 74/497
[58] Field of Search ............... 280/91, 99; 74/110, 74/497

[56] References Cited

U.S. PATENT DOCUMENTS

| | | | |
|---|---|---|---|
| 4,614,351 | 9/1986 | Sano et al. | 280/91 |
| 4,813,694 | 3/1989 | Boberg et al. | 280/91 |
| 4,826,188 | 5/1989 | Boberg et al. | 280/91 |
| 4,869,519 | 9/1989 | Lucien et al. | 280/91 |
| 4,909,528 | 3/1990 | Schramm | 280/91 |
| 4,941,672 | 7/1990 | Godin | 280/91 |

FOREIGN PATENT DOCUMENTS 0299859  1/1989  European Pat. Off. .
2566360 12/1985  France .

*Primary Examiner*—Kenneth R. Rice
*Attorney, Agent, or Firm*—Kenyon & Kenyon

[57] ABSTRACT

A rear steering control device for an automotive vehicle, wherein the finger carrying the roller portion is secured to a hub rigidly secured in coaxial relationship to both adjacent ends of both rear steering drag rods, respectively, and the drive shaft is coupled to a disc formed with peripheral teeth for rotating it about its axis when locking the front wheels so that the cam-like groove causes the rear steering drag rods to be moved in parallel relation to the axis.

18 Claims, 6 Drawing Sheets

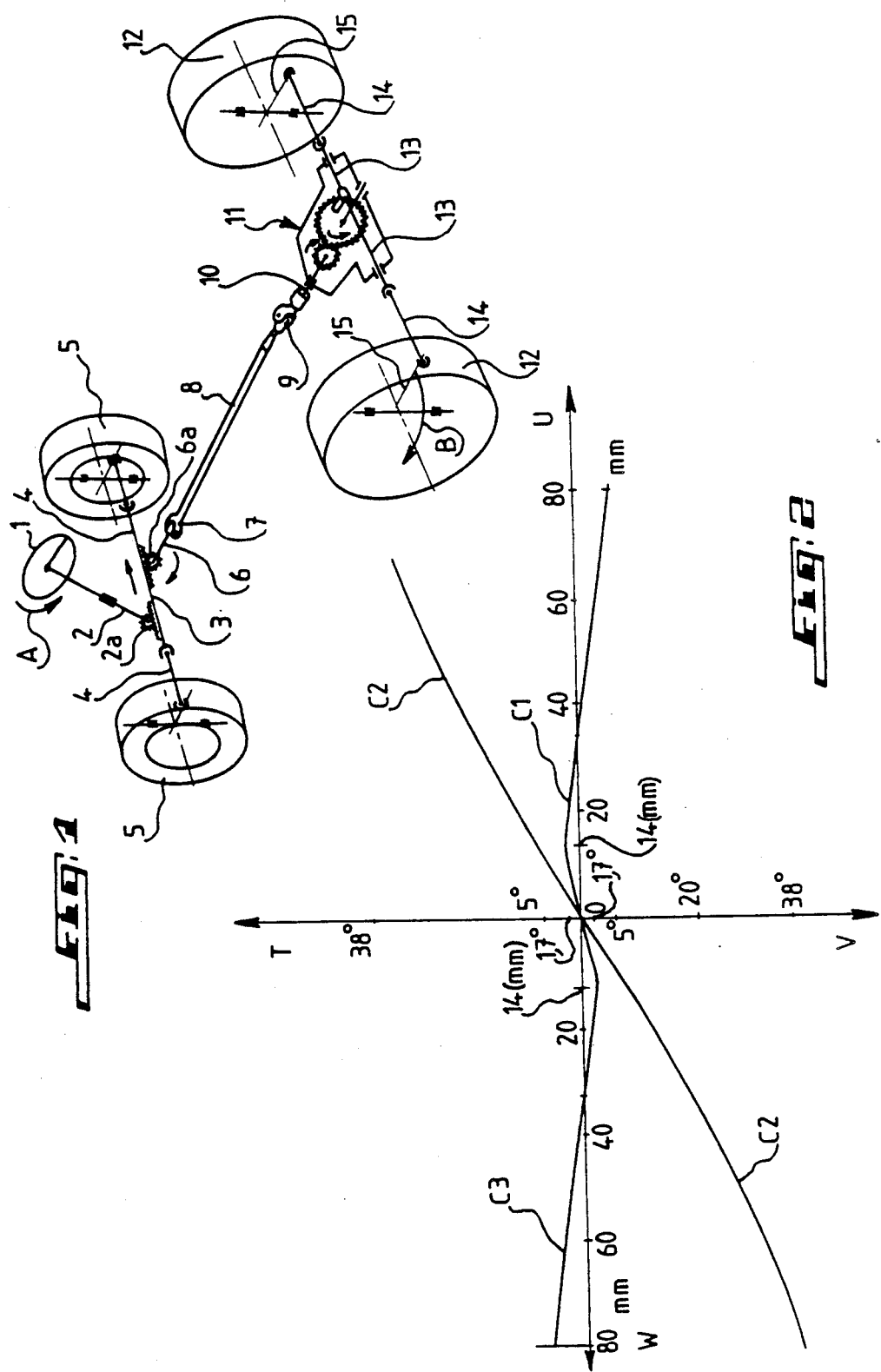

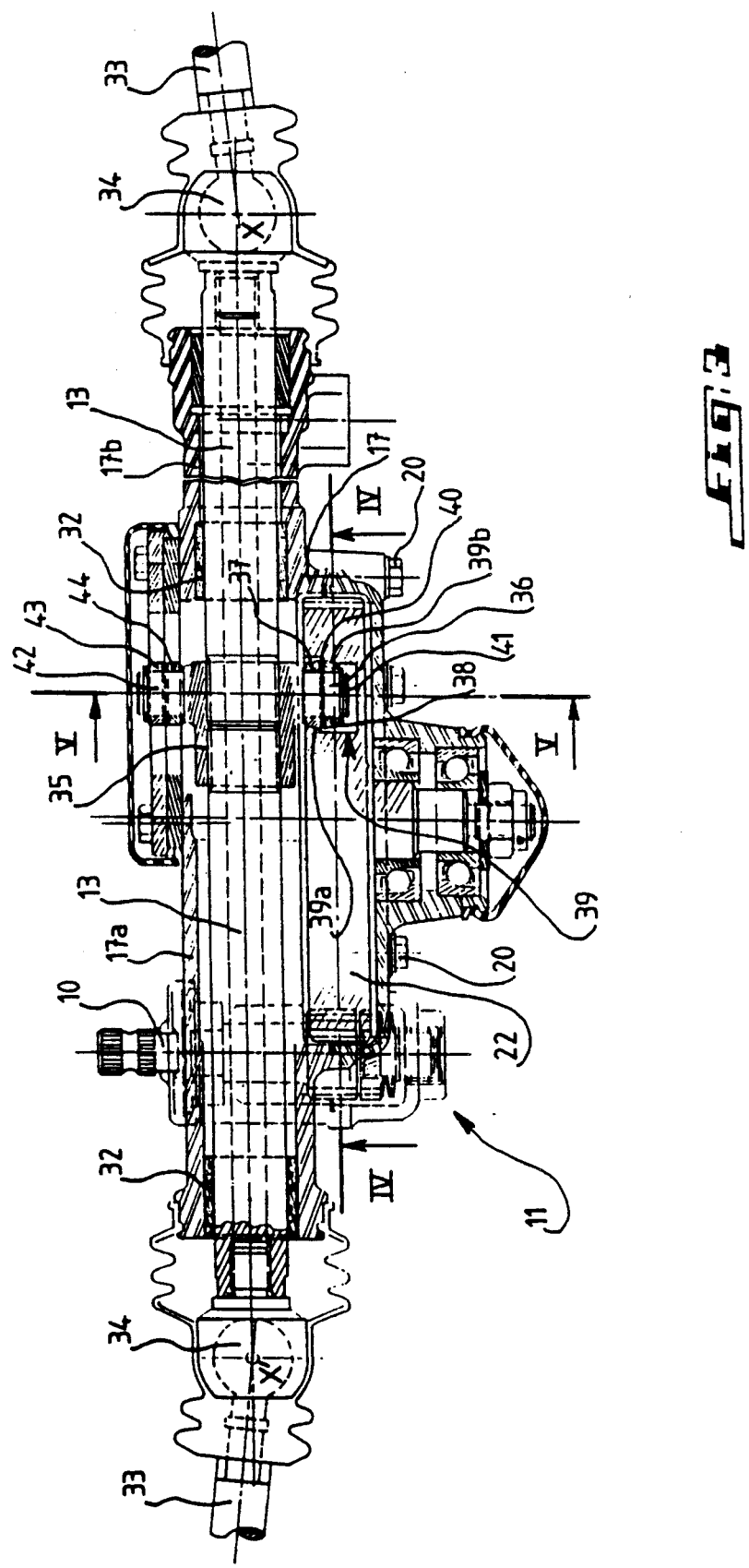

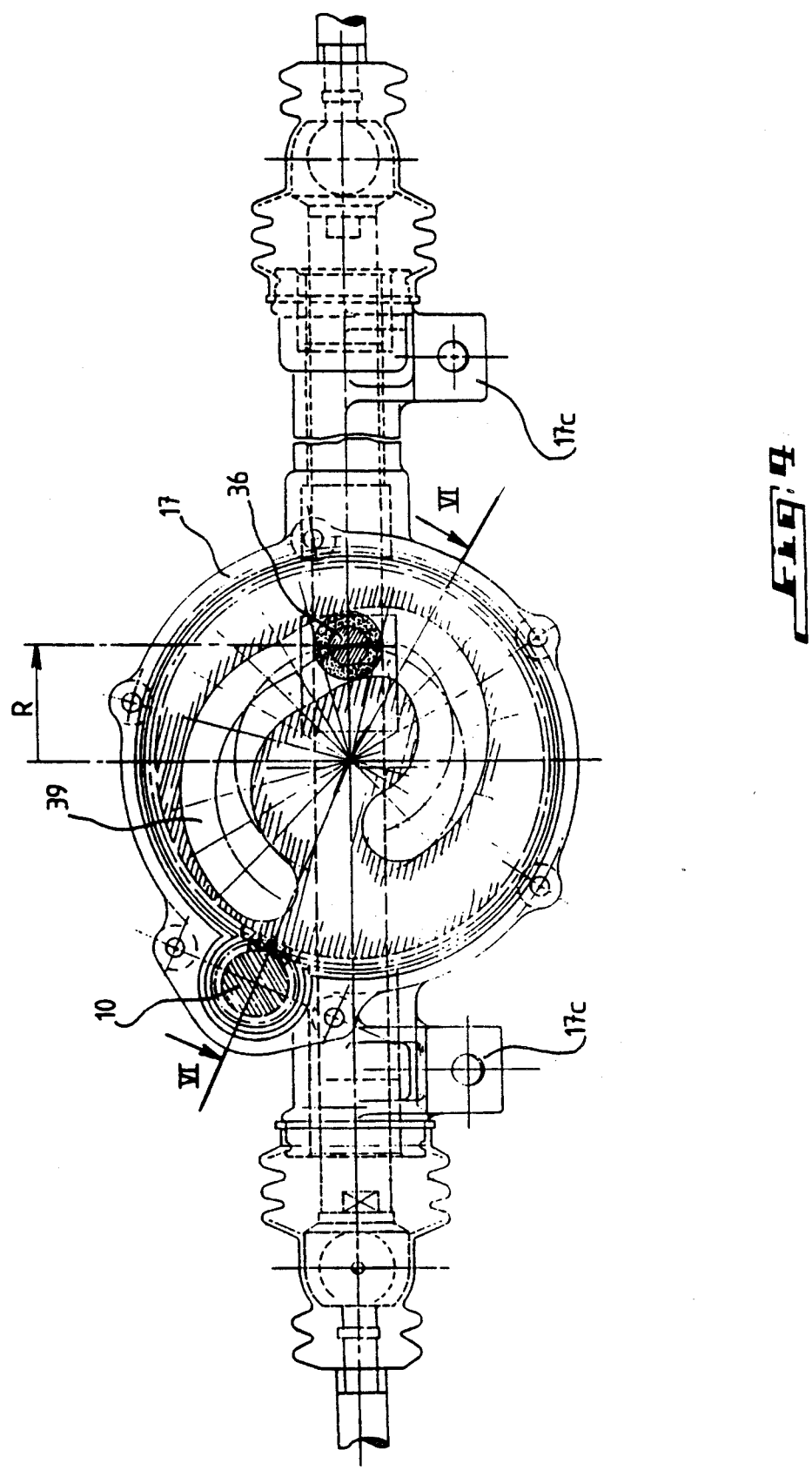

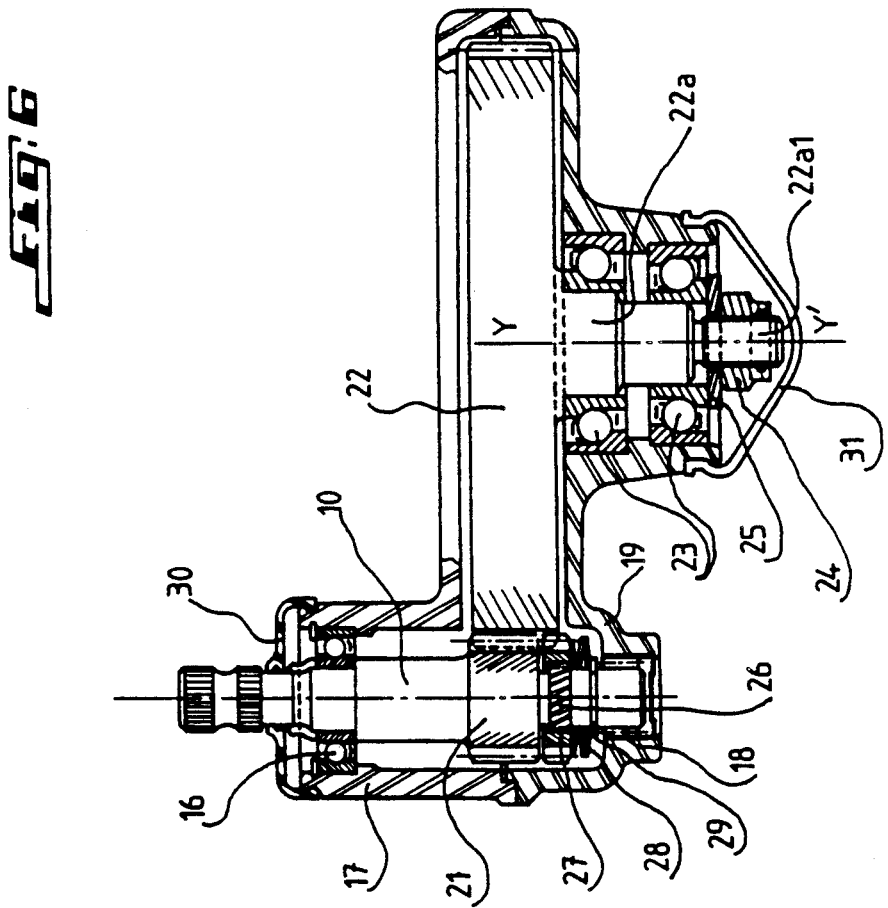
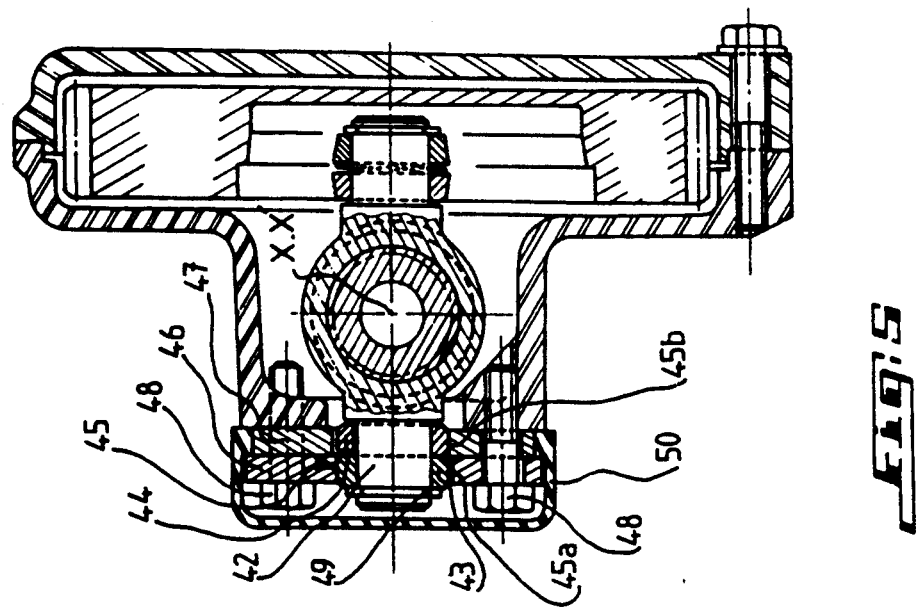

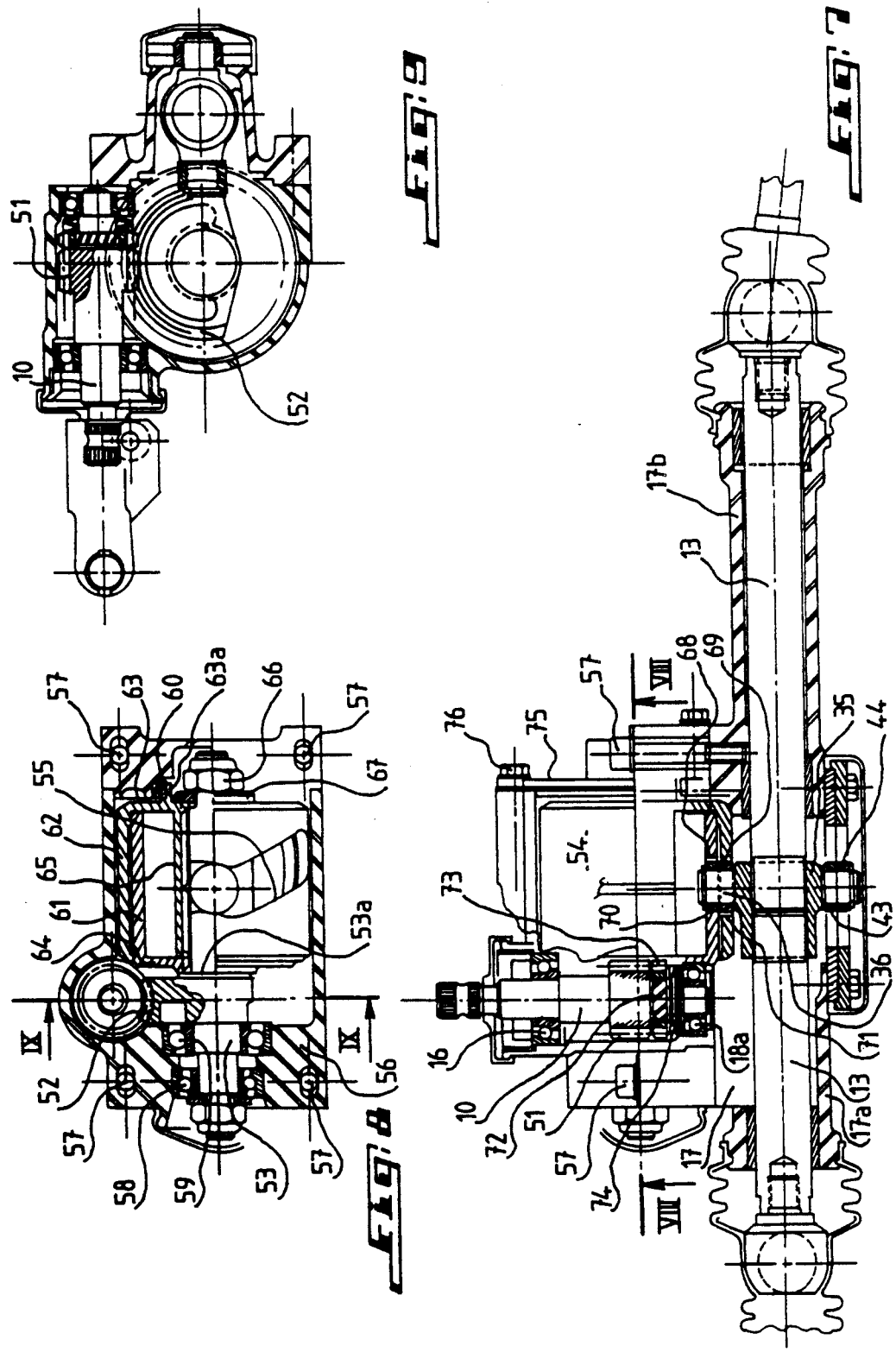

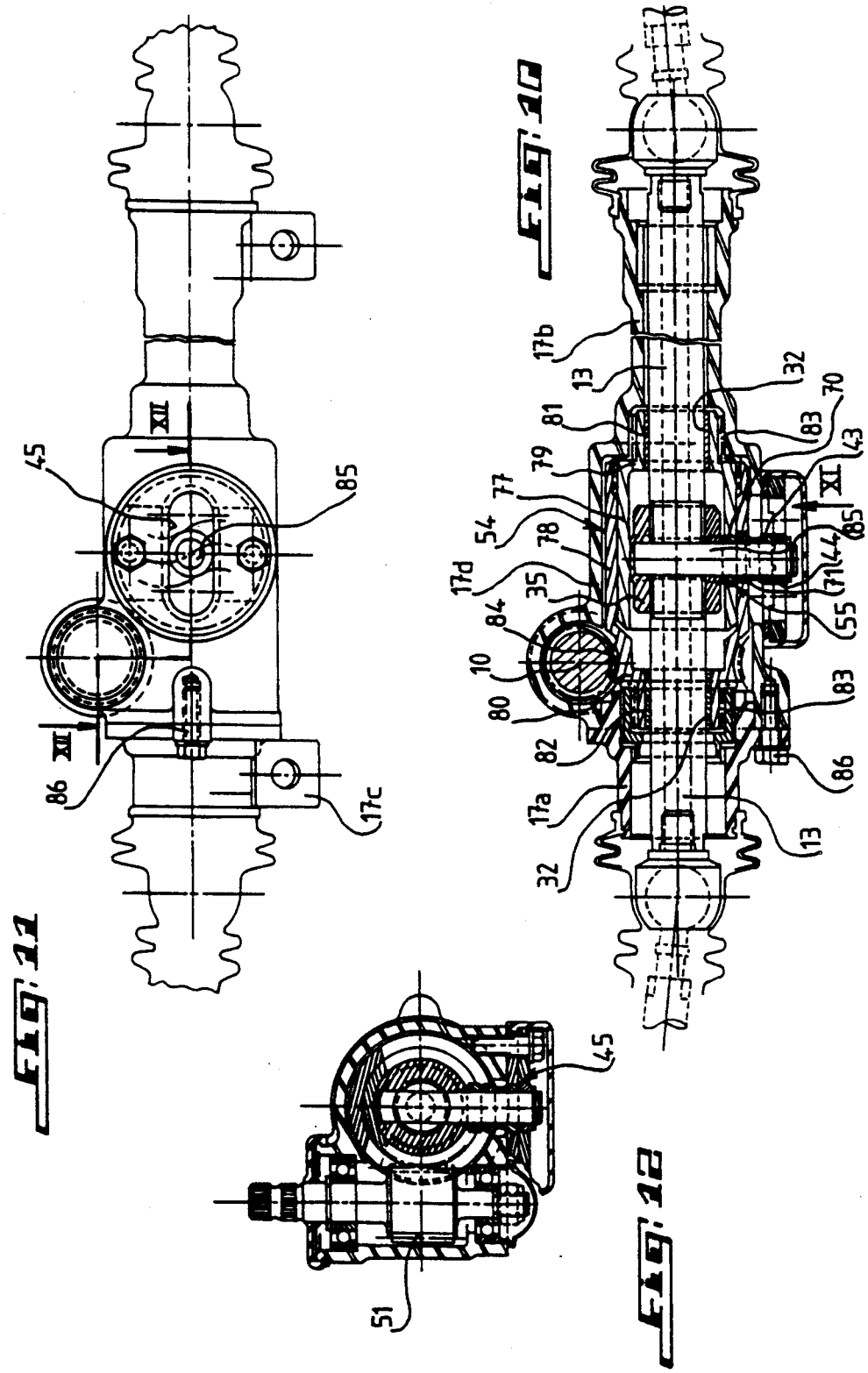

REAR-STEERING CONTROL DEVICE FOR AUTOMOTIVE VEHICLE WITH FOUR-WHEEL STEERING

The present invention relates essentially to a rear-steering control device in particular for an automotive vehicle with four-wheel steering.

Such a device has to operate the lock of the rear wheels in accordance with the lock of the front wheels set by the steering wheel of the vehicle.

It is known that to obtain the best possible road behaviour of the vehicle under the conditions and requirements defined hereinabove it is necessary to lock the rear wheels over in the same direction as the front wheels for a lock value of the steering wheel smaller than a predetermined threshold value and in the direction opposite from the front wheels when the lock value exceeds the threshold value. Thus is provided a desirable oversteering effect of the vehicle when the steering lock is relatively great for instance when the vehicle is being parked in a garage or in a parking lot or car park and an also desirable understeering effect of the vehicle when the steering lock is relatively small as is the case when the vehicle is riding or moving relatively fast.

Such a device meeting the conditions referred to hereinabove is for instance disclosed in the U.S. Pat. No. 4869519 issued on Sept. 29, 1989 in the names of the Applicants.

According to the device known from this prior French patent application the back-steering drag rods or links are axially displaced according to a predefined law for controlling the pivoting of the rear wheels in either direction from a mean or average wheel alignment adjusting position of the vehicle on a straight line.

The arrangement of the known device however is such that it gives rise to frictions or rubbings when it is operated and therefore results in a poor efficiency and a bad return of the steering wheel to the straight line position of the vehicle. Moreover the known device is relatively cumbersome or bulky and does not allow to carry out a quick replacement of the cam profile defining the above-mentioned locking law, such a replacement often proving necessary to adapt the road behaviour of the vehicle to the road onto which it is moving especially when the latter is a racing vehicle.

A main object of the present invention is to remove the inconveniences referred to hereinabove by providing a back-steering control device in particular for an automotive vehicle with four-wheel steering the rear wheels of which are connected to steering drag rods or links operating the pivoting of the rear wheels and of the type comprising a transmission shaft mounted in longitudinal relation to the vehicle so as to be pivotable about its axis in response to an action of locking of the front wheels of the vehicle and a back steering mechanism mechanically connected to the rear end of the transmission shaft through the agency of a drive shaft and to the rear steering drag rods or links for operating the locking over of the rear wheels in accordance with the locking over of the front wheels, said mechanism comprising in movable relationship with respect to each other under the action of the drive shaft a member comprising a cam-like groove the profile of which defines the law of locking of the rear wheels according to the locking of the front wheels and a roller portion engaging the groove and carried by a rigid finger extending in transverse relation to the direction of displacement of the rear steering drag rods or links, which device is characterized in that the finger carrying the roller portion is secured to a hub rigidly fastened in coaxial relationship to both adjacent ends, respectively, of both rear steering drag links and the drive shaft is coupled to the member comprising the groove in particular through a gear transmission for rotating it about a stationary axis of rotation when locking over the front wheels so that the cam-like groove causes the rear steering drag rods to move in parallel relation to the member formed with a groove through the medium of the roller-carrying finger-hub unit portion.

According to an embodiment the aforesaid gear transmission is of the kind comprising a drive pinion made fast with the drive shaft and meshing with a peripheral toothing of the aforesaid disk-shaped member.

According to a particular characterizing feature of the invention the cam-like groove comprises two opposite inclined parallel side walls and the aforesaid roller portion comprises two frusto-conical or tapered rollers journalled in revolving relationship on said finger and kept in bearing engagement with both inclined side walls, respectively, by a resilient washer for instance of the conical washer kind fitted between both rollers.

Advantageously the drive shaft comprises play take-up means between the drive pinion and the peripheral toothing of the disk.

These play take-up means comprise a helically toothed pinion secured to the drive shaft, a ring or crown gear having inner helical teeth meshing with the helically toothed pinion and outer spur teeth meshing with the peripheral spur teeth of the disk and a spring member for pushing the ring gear against the helical teeth of the pinion of the drive shaft.

According to another characterizing feature of the invention a second finger secured to said hub carries a second roller portion engaging a stationary guide groove extending in parallel relation to the direction of displacement of the rear steering drag rods, which groove consists of two lower and upper grooves formed in two overlying plates, respectively, secured to the box or casing housing the rear steering mechanism, the second roller portion comprising two overlying cylindrical guide rollers rotatably journalled on the second finger and oppositely bearing against a side wall of the lower groove and an opposite side wall of the upper groove, respectively.

According to a second embodiment the member formed with the cam-like groove is shaped as a drum with two inner and outer cylindrical side walls overlain in contiguous relationship, the axis of rotation of which extends at right angles to the drive shaft and the cam-like groove is defined by two inner and outer grooves formed in both inner and outer side walls, respectively, and the first roller portion comprises two overlying cylindrical rollers rotatably journalled onto their corresponding finger and kept in opposite bearing engagement with one side wall of the inner groove and one opposite side wall of the outer groove, respectively.

According to this second embodiment the gear transmission is of the kind comprising a worm portion integral with the drive shaft and tangentially meshing with a toothed sector or segment gear secured to the shaft of the drum.

Advantageously the fingers carrying the first and second roller portions, respectively, are arranged in diametrally opposite relationship.

Like the first embodiment the drive shaft comprises play take-up means betweeen said worm portion and said toothed sector or segment gear, comprising a helically toothed pinion secured to the drive shaft, a ring or crown gear having inner helical teeth meshing with the helically toothed pinion and an outer worm in meshing engagement with the toothed sector or segment gear, and a thrust spring member such as a conical washer for pushing the ring gear against the helical teeth of the pinion of the drive shaft.

According to a third embodiment the rear steering drag links as well as their connecting hub are arranged coaxially inside of the drum the axis of rotation of which is thus coinciding with or the same as the longitudinal axis of the rear steering drag rods and said first and second fingers carrying the roller portions form a single finger extending through the double wall of the drum with the guide roller portion located near the free end of the single finger.

The invention will be better understood and further objects, characterizing features, details and advantages thereof will appear more clearly as the following explanatory description proceeds with reference to the accompanying diagrammatic drawings given by way of non limiting examples only illustrating several presently preferred specific embodiments of the invention and wherein:

FIG. 1 is a perspective diagrammatic view of an automotive vehicle fitted with a steering device according to the invention;

FIG. 2 illustrates an exemplary graphic chart showing the locking curve of the rear wheels versus the front wheels;

FIG. 3 is a view in longitudinal section of the device according to the invention;

FIG. 4 is a view in cross-section taken upon the line IV—IV of FIG. 3;

FIG. 5 is a view in cross-section taken upon the line V—V of FIG. 3;

FIG. 6 is a view in cross-section taken upon the line VI—VI of FIG. 4;

FIG. 7 is a view in longitudinal section like that of FIG. 3 but showing a second embodiment of the device according to the invention;

FIG. 8 is a view in cross-section taken upon the line VIII—VIII of FIG. 7;

FIG. 9 is a view in cross-section taken upon the line IX—IX of FIG. 8;

FIG. 10 is a view in longitunal section like that of FIG. 3 but showing a third embodiment of the device according to the invention;

FIG. 11 is a view seen in the direction of the arrow XI of FIG. 10; and

FIG. 11 is a view in cross-section taken upon the broken line XII—XII of FIG. 11.

Referring to FIG. 1 the reference numeral 1 designates a steering wheel the steering shaft 2 of which is connected through the medium of a toothed pinion 2a to a shaft with gear racks 3 the ends of which are connected to two steering tracks or spindle connecting rods 4, respectively, to the outer ends of which are connected the front wheels 5 which are steerable or angularly swivable according to the lock direction of the steering wheel. A shaft 6 with a toothed pinion 6a meshing with a gear rack of the shaft 3 extends backwards of the latter and has its rear end connected through a universal joint or Cardan coupling 7 to a transmission shaft 8 mounted in longitudinal relation to the vehicle. The rear end of the shaft 8 is connected through a universal joint or Cardan coupling 9 to a drive shaft 10 of a rear steering mechanism 11 arranged between both back wheels 12 of the vehicle. The rear steering mechanism 11 is mechanically connected to two rear steering drag rods 13 operating through the medium of links 14 levers 15 for pivoting the rear wheels 12 mounted on knuckle or king pins.

The rear steering mechanism 11 is adapted to lock over the rear wheels 12 in the same direction as the front wheels 5 for a lock value of the steering wheel smaller than a threshold value and in the direction opposite to the front wheels when the lock value of the steering wheel exceeds the threshold value.

The actuation of the locking over of the rear wheels 12 in accordance with the locking over of the front wheels 5 is carried out according to a predetermined law such as that shown by way of example by the curve on FIG. 2. On this Figure on the half axes OU and OW have been plotted the values of the stroke of the front rack shaft 3 corresponding to lock values of the steering wheel 1 during the motions of the vehicle in a right-hand turn and in a left-hand turn, respectively. On the half axes OT and OV are plotted the lock values of the front and rear wheels rightwards and leftwards, respectively, with reference to FIG. 1. More specifically the curve C1 located on the right side of the axis TOV illustrates both directions of lock of the rear wheels 12 according to the stroke of the shaft 3 or the lock amplitude given to the steering wheel 1 in the same direction, the curve C2 relating to the mean lock of the front wheels according to the stroke of the shaft 3. When the steering wheel 1 is turned in the direction of the arrow A on FIG. 1 through a small lock lower than a threshold value corresponding in the present instance to a stroke of the shaft 3 of about 14 millimeters the rear wheels are locked in the same direction as the front wheels as shown by the arrow B on FIG. 1 by a maximum lock of about 1.7 degree corresponding to the threshold value so as to produce a desirable understeering effect of the vehicle. When the steering wheel is turned through a substantial lock greater in the present case than the threshold value corresponding to a stroke of 14 millimeters of the shaft 3 the rear wheels are locked in the direction reverse from the arrow B, hence opposite to the front wheels by passing through the alignment condition of the wheels of the vehicle on a straight line (corresponding to a stroke of about 35 millimeters of the shaft 3) up to a maximum lock value of the rear wheels leftwards of about 5 degrees for a lock value of the steering wheel corresponding to a stroke of about 80 millimeters of the shaft 3 so as to produce a desirable oversteering effect of the vehicle. The same reasoning is made with reference to the curve C3 located on the left side of the axis TOV and will not be explained in detail except that with a lock in a direction reverse from the arrow A of the steering wheel lower than a value corresponding to a stroke of about 14 millimeters of the shaft 3, the rear wheels are locked leftwards with respect to FIG. 1 in the same direction as the front wheels whereas with a substantial lock of the vehicle in the same direction the rear wheels are locked rightwards hence in the direction opposite to the front wheels by passing through their alignment with respect to the longitudinal axis of the vehicle (corresponding to a stroke of about 35 millimeters of the shaft 3) so as to generate two desirable understeering and oversteering effects, respectively, of the vehicle.

The device according to the invention is therefore adapted to control the lock of the rear wheels in accordance to the lock of the front wheels according to a locking law defined by the curve $C_1$ or $C_3$, it being understood that any other law whatsoever adapted to the behaviour of the vehicle could be devised.

According to a first embodiment of the device shown on FIGS. 3 to 6 the drive shaft 10 is rotatably mounted within the mechanism 11 through the agency of a ball bearing 16 secured to the casing 17 of the mechanism 11 and of a needle bearing 18 secured to a cover or lid portion 19 of the mechanism 11 and made fast with the casing 17 through fastening screws 20. The shaft 10 is thus maintained in coaxial relationship within the mechanism 11 by the bearings 16 and 18 and has its longitudinal axis perpendicular to the longitudinal axis X—X' of both coaxial steering drag rods 13, the axis X—X' also representing the direction of axial displacement of the rods 13 in two cross-braces 17a and 17b, respectively, of the casing 17 mounted transversely between the rear wheels 12. The shaft 10 comprises secured thereto a pinion 21 with a spur toothing meshing with a peripheral spur toothing of a plate or disc 22 mounted for rotation about an axis Y—Y' perpendicular to the axis X—X'. The rotary shaft 22a of the plate 22 is secured in a suitable recess of the cover 19 through the medium of a pair of inner and outer axially spaced ball bearings 23 secured in the recess and of a nut 24 screwed onto a threaded stub portion 22a1 of the shaft 22a while bearing upon a washer 25 itself engaging the outer bearing 23. The shaft 10 moreover comprises play take-up means between the drive pinion 21 and the peripheral teeth of the plate 22. These means comprise a pinion 26 with helical teeth of a very great pitch secured to the shaft 10 near the pinion 21, a ring or crown gear 27 with an inner helical toothing meshing with the pinion 26 and with an outer spur toothin meshing with the peripheral teeth of the plate 22, and a resilient thrust spring member 28 pushing or urging the ring gear 27 against the helical toothing of the pinion 26. Advantageously the spring member 28 consists of a conical washer axially retained onto a corresponding portion of the drive shaft 10 and bearing upon the side face of the ring gear 27 opposite to the pinion 21 through a resilient ring or circlips 29 made fast with that end portion of the shaft 10 which is opposite to that connected to the transmission shaft. A protective cover or cap 30 mounted in coaxial relationship about one portion of the input end of the shaft 10 is secured in a corresponding annular groove of an input extension of the casing 17 whereas another protective cover or cap 31 closes the outer part of the recess of the shaft 22a. The cover 19 is located rearwards of the cross members 17a and 17b and the longitudinal axis of the shaft 10 is located between the axis Y—Y' and the left rear wheel of the vehicle while being positioned at some distance above the cross members 17a and 17b of the casing. The rear steering drag links 13 are guided in their axial displacements along the axis X—X' by two spaced bearings 32 secured to the cross members 17a and 17b of the casing, respectively. Both links or rods 13 are pivotally connected at their two opposite ends to a link 33 through the medium of a knuckle 34, each link 33 having its end opposite from the knuckle 34 pivotally connected to a control lever (not shown) for pivoting the associated rear wheel. The casing 17 comprises lugs 17c for fastening the mechanism 11 to the body back part (not shown) of the vehicle, the lugs 17c being in the present case integral with the cross members 17a and 17b of the casing.

Both rods 13 have their two adjacent ends secured to each other by a hub or sleeve 35. For that purpose the free end of each rod 13 is screw-threaded and screwed into a corresponding tapped portion of the hub 35, both adjacent ends of the rods 13 being screwed home into the hub 35 to cause their free ends to engage one another. A rigid finger 36 is made fast with the hub 35 perpendicularly to the axis X—X' and carries two respectively inner and outer identical frusto-conical rollers 37, 38 rotatably journalled onto the finger 36 and engaging a cam-like groove 39 machined into the plate 22 and having a profile defining the locking law of the rear wheels according to the lock of the front wheels. The profile of the groove 39 such as shown on FIG. 4 defines the locking law shown on FIG. 2. More specifically the groove 39 comprises two parallel, inclined, opposite, curved side walls 39a and 39b with the rollers 37 and 38 kept in bearing engagement against both inclined walls 39a and 39b, respectively, through the medium of a resilient washer 40 such for instance as a washer of the conical type fitted between both rollers 37 and 38 and tending to spread them apart or to move them away from each other. Both rollers 37 and 38 axially are maintained onto the finger 36 through the agency of a snap ring, circlip or like retaining ring 41.

The rods 13 are held against rotation about the axis X—X' by a second rigid finger 42 integral with the hub 35 and diametrally opposite to the finger 36. The finger 42 carries two respectively outer and inner overlying cylindrical rollers 43, 44 engaging a stationary guide groove 45 parallel to the axis X—X' and consisting of two outer and inner grooves 45a, 45b formed in two plates 46 and 47, respectively, overlain in mutually engaging relationship and secured to the casing 17 by fastening screws 48. Both rollers 43 and 44 have each one the same outer diameter which is smaller than the identical width of each groove 45a, 45b whereas their inner diameter is slightly greater than the diameter of the finger 42. Before securing both plates 46, 47 to the casing 17, they are moved in opposite directions with respect to each other in a direction perpendicular to the axis X—X' by means of an operating lever (not shown) adapted to exert upon both plates 46, 47, forces in opposite directions, respectively, in perpendicular relation to the axis of the finger 42 and passing therethrough. The forces react so that the inner roller 45b be positioned in bearing engagement practically without any clearance or play between the finger 42 and the side wall of the groove 45b located on the left side of the axis of the finger 42 (see FIG. 5) and the outer roller 43 be positioned in bearing engagement also practically without any play or clearance between the finger 42 and the side wall of the groove 45a located on the right side of the axis of the finger 42 hence opposite to the wall of the groove 45b against which is bearing the inner roller 44. The relative displacement in opposite directions of both plates 46, 47 therefore amounts to take up the play which may exist between the rollers 43, 44 and the guide groove 45 while however allowing these rollers to revolve about the finger 42. The play take-up forces are maintained during the tightening of the fastening screws 48. Both rollers 43 and 44 are thus bearing in opposition against one side wall of the outer groove 45a and one opposite side wall of the inner groove 45b, respectively. Moreover the rollers 43 and 44 are kept in coaxial relationship with the finger 43 by a snap ring, circlip or like retaining ring 49 secured to the free end of the finger 42. The plates 46 and 47 as well as the rollers 43 and 44 are protected from dust by a cover, guard or like cap 50.

The operation of the device described hereinabove results already from the description which has been made thereof and will now be discussed briefly.

The pivoting about its axis of the transmission shaft 8 subsequently to the locking motions of the steering wheel 1 would rotate the shaft 10 the pinion 21 of which rotates the toothed plate 22 about the axis Y—Y' in either direction according to the locking direction of the steering wheel. The cam portion 39 of the rotary plate 22 causes the finger 36 to be moved along a path of travel corresponding to the profile of the groove 39, the guidance of the finger 36 within the groove 39 being provided by the rollers 37, 38 riding on the side walls 39a, 39b of the groove with a permanent conctact force exerted thereupon owing to the spring washer 40. The rollers 37, 39 and the finger 36 drive the hub 35 along the axis X—X' without any beat or jarring plays and in a direction allowing the lock of the rear wheels in accordance with the locking law of FIG. 2. The axial displacement of the hub 35 and of the rods 13 is guided by the finger 42 carrying the rollers 43, 44 riding in the guide groove 45. The profile of the cam-like groove 39 of the plate 22 is acting so as to vary the value of the radius R shown on FIG. 4 by a same value for a same corresponding angular value of rotation of the plate 22 on either side of a mean position on a straight line of the wheels of the vehicle. This variation in the radius R corresponds to a lock of the rear wheels related to a lock of the front wheels.

The device according to the second embodiment shown on FIGS. 7 to 9 differs from that of the first embodiment by the cam mechanism driving the rear steering drag links 13 along the axis X—X' and by the gear transmission between the shaft 10 and this mechanism.

The shaft 10 comprises secured thereto a worm portion 51 tangentially meshing with a toothed sector 52 secured to a shaft 53 parallel to the axis X—X' of the rear steering drag rods 13 and rotating a drum 54 provided with a cam-like groove 55 formed on the cylindrical side wall thereof. The shaft 10 and the shaft 53 are each one rotatably mounted in a casing 56 secured to the casing cross members 17a, 17b forward thereof by fastening screws 57. The shaft 10 is supported in the casing 56 by ball bearings 16 and 18a. The shaft 53 is rotatably mounted in the casing 56 through the medium of a pair of ball bearings 58, 59 located on one side of the shaft and of a ball bearing 60 located on the opposite side of the shaft 53.

The drum 54 consists of two respectively inner and outer cylindrical side walls 61 and 62 overlain in mutually engaging relationship. The wall 62 is connected to a radial wall 63 extending at right angles to the shaft 63 and on the inner face of which is abutting the end of the inner side wall 61. The wall 63 comprises an annular projecting portion 63a for supporting the bearing 60. The side wall 61 is also connected to a radial wall 64 opposite to the wall 63 and in abutting engagement with a corresponding shoulder 53a of the shaft 53. A brace like portion 65 integral with the wall 63 is abutting against the inner face of the wall 64 when a nut 66 is screwed onto a threaded portion of the shaft 53 and blocked in bearing engagement on a washer 67 itself in engagement with a corresponding outer face of the wall 63. Thus the walls 61 to 64 defining the drums 54 are secured to the shaft 53.

The cam-like groove 55 having in the present case a substantially S-like shape is defined by two inner and outer grooves 68, 69 formed through the side walls 61 and 62, respectively. The parallel or opposite side walls of each one of the two grooves 68 and 69 are straight and perpendicular to the axis of rotation of the drum 54. At 36 is shown the finger carrying two respectively inner and outer overlying cylindrical rollers 70, 71 rotatably journalled onto the finger 36 and kept in engagement in opposing relationship with a side wall of the inner groove 68 and an opposite side wall of the outer groove 69, respectively, after blocking of the nut 66. The finger 36 is secured to the hub 35 connecting both adjacent ends of the rear steering drag rods 13 and the finger 42 secured to the hub 35 and still diametrally opposite to the finger 36 carries both rollers 43, 44 engaging the guide groove 45 as in the first embodiment.

The drive shaft 10 also comprises play take-up means between the worm portion 51 and the toothed sector 52. These means comprise a helically toothed pinion 72 secured to the shaft 10, a crown or ring gear 73 with a helical inner toothing in meshing engagement with the pinion 72 and having an outer worm in meshing engagement with the toothed sector 52 and a spring member 74 such for instance as a washer of the conical type urging the ring gear 73 against the helical teeth of the pinion 72.

The rotary driving of the shaft 10 by the transmission shaft 8 also rotates the worm 51 and through the agency of the toothed sector 52 rotates the drum 54 the groove 55 of which pushes the finger 36 through the medium of the riding rollers 68, 69 along the predetermined profile of the groove 55 defining a locking law for the rear wheels in accordance with the lock of the front wheels. The thrust action exerted upon the finger 36 axially moves along the axis X—X' the hub 35 and the rear steering drag rods 13, the axial guidance of the rods 13 being provided by the rollers 43, 44 riding on the guide groove 45.

The second embodiment is particularly adapted for quickly effecting the replacement of the drum 54 with another drum carrying a cam-like groove with a different profile by disconnecting the box or casing 56 from the casing 17 by unscrewing the screws 57 and by withdrawing the protective cover 75 from the box 56 by unscrewing the fastening screws 76.

According to the third embodiment shown on FIGS. 10 to 12 the drum 54 instead of being secured externally to the casing cross members 17a, 17b parallel to the rear steering drag links 13 as in the second embodiment is positioned in a housing box 17d of the casing 17 located between the cross members 17a and 17b with the longitudinal axis of the drum 54 coinciding with the axis X—X' of displacement of the rods 13.

The drum 54 is defined by two respectively inner and outer cylindrical side walls 77, 78 overlain in mutually engaging relationship and two radial walls 79, 80 perpendicular to the axis X—X' and connected to both side walls 77, 78, respectively. To the walls 79, 80 are connected two tubular portions 81, 82, respectively, coaxial with the axis X—X' and forming bearing supporting members 83 for bearings for instance of the needle type which are accommodated within corresponding bores of the casing 17d. The tubular portions 81 and 82 also form bearing supports 32. A toothed wheel 84 is machined on the connecting portion between the side wall 78 and the radial wall 80 and meshes with the worm portion 51 of the shaft 10 still in perpendicular relation to the axis X—X'.

According to this embodiment one single rigid finger 85 is used to carry the cylindrical rollers 70 and 71 co-operating with the cam-like groove 55 and the cylindrical rollers 43, 44 co-operating with the guide groove 45. The finger 85 is arranged transversely of the hub 35 by extending through the latter and the side walls of the drum 54 below the axis X—X'. FIG. 10 shows the finger 85 having its end opposite to that carrying the rollers 43, 44 and 70, 71 secured for instance through force fitting to the corresponding cylindrical side wall of the hub 35 but it should be understood that the finger 85 may be secured to the hub 35 by only projecting from the cylindrical side wall of the hub 35 located towards the guide groove 45. It should be pointed that the casing 17d is made integral through moulding with the cross member 17b of the casing whereas the cross member 17a consists of an independent part secured to the casing 17c by fastening screws 86. The cam-like groove 55 as in the second embodiment is of course made of two inner and outer grooves formed in the walls 77 and 78, respectively, of the drum with the cylindrical rollers 70 and 71 kept in bearing engagement in opposite relationship with a right side wall of the inner groove and with an opposite right side wall of the outer groove, respectively.

By thus providing a drum with a cam for driving the rear steering drive rods 13 and rotatably mounted in a casing housing box coaxially with the axis X—X' of displacement of the rods 13 the size or bulk of the device according to the invention is substantially reduced. The gear drive of the drum 54 according to FIG. 10 may be provided by a bevel spur wheel secured to the shaft 10 and meshing with a bevel spur wheel secured to the drum 54.

What is claimed is:

1. A rear steering control device in particular for an automotive vehicle with four-wheel steering the rear wheels of which are connected to steering drag rods operating the pivoting of the rear wheels and of the kind comprising a transmission shaft mounted in longitudinal relation to the vehicle so as to be pivotable about its axis in response to an action of locking the front wheels of the vehicle and a rear steering mechanism mechanically connected to the rear end of the transmission shaft through the medium of a drive shaft and to the rear steering drag rods for operating the locking of the rear wheels in accordance with the lock of the front wheels, said mechanism comprising as being movable with respect to one another under the action of the drive shaft, a member comprising a cam-like groove the profile of which defines the law for locking the rear wheels in accordance with the lock of the front wheels and a roller portion engaging the groove and carried by a rigid finger extending transversely of the direction of displacement of the rear steering drag rods, wherein the improvement consists in that the finger carrying the roller portion is secured to a hub rigidly connected in coaxial relationship to both adjacent ends of both rear steering drag rods, respectively, and the drive shaft is coupled to the member comprising the cam-like groove in particular by a gear transmission for rotating it about a stationary axis of rotation during the locking of the front wheels so that the cam-like groove causes the rear steering drag rods to be displaced in parallel relation to the member carrying the cam-like groove through the medium of the roller supporting finger hub unit portion.

2. A device according to claim 1, wherein the drive shaft is perpendicular to the direction of displacement of the rear steering drag rods.

3. A device according to claim 1 or 2, further comprising a second finger secured to said hub and carrying a second roller portion engaging a stationary guide groove extending in parallel relation to the direction of displacement of the rear steering drag rods.

4. A device according to claim 3, wherein the stationary guide groove consists of two outer and inner grooves formed in two overlying plates secured to the casing of the rear steering mechanism and the second roller portion comprises two overlying cylindrical guide rollers rotatably journalled onto the second finger and bearing in opposition against a side wall of the upper groove and an opposite side wall of the lower groove.

5. A device according to claim 3, wherein fingers carrying the first and second roller portions, respectively, are diametrally opposite to each other.

6. A device according to claim 1, wherein the drive shaft carries a drive pinion meshing with a peripheral toothing of said disc-shaped member.

7. A device according to claim 1, wherein the cam-like groove comprises two inclined opposite parallel side walls and the first roller portion comprises two frusto-conicol rollers rotatably journalled on the finger and kept in bearing engagement with both inclined side walls, respectively, by a resilient washer for instance of the conical type fitted between both rollers.

8. A device according to claim 6, wherein the drive shaft comprises play take-up means between the drive pinion and the peripheral teeth of said disk.

9. A device according to claim 8, wherein the teeth of the drive pinion and the peripheral teeth of the disk are of the spur kind and the play take-up means comprise a helically toothed pinion secured to the drive shaft, a ring gear with inner helical teeth meshing with the helically toothed pinion and with outer spur teeth meshing with the peripheral spur teeth of the disc and a spring member for pushing the ring gear against the helical teeth of the pinion of the drive shaft.

10. A device according to claim 9, wherein the spring member is a washer of the conical type retained axially on the drive shaft by a resilient snap ring such as a circlip secured to the drive shaft.

11. A device according to claim 1, wherein the axis of rotation of the disc-shaped member is parallel to the drive shaft.

12. A device according to claim 1, wherein said member is shaped as a drum with two inner and outer cylindrical side walls overlain in mutually engaging relationship the stationary axis of rotation of which is perpendicular to the drive shaft and the cam-like groove is defined by two inner and outer grooves formed in both inner and outer side walls, respectively, and the first roller portion comprises two overlying cylindrical rollers rotatably journalled onto the finger and kept in engagement in opposition with one side wall of the inner groove and with one opposite side wall of the outer groove, respectively.

13. A device according to claim 12, wherein said drum is mounted on a rotary shaft, the drive shaft comprises a worm portion meshing tangentially with a toothed sector secured to the drum shaft.

14. A device according to claim 13, wherein the fingers carrying both roller portions are diametrally opposite to each other.

15. A device according to claim 13, wherein the drive shaft comprises play take-up means between the worm portion and the toothed sector comprising a helically toothed pinion secured to the drive shaft, a ring gear having inner helical teeth meshing with the pinion and an outer worm meshing with the toothed sector and a spring member such as a conical washer for pushing the ring gear against the helical teeth of the pinion of the drive shaft.

16. A device according to claim 15, wherein the drum shaft is parallel to the direction of displacement of the rear steering drag rods and together with the drum is positioned outside of the casing cross members within which the rods are moving.

17. A device according to claim 12, wherein the rear steering drag rods as well as their connecting hub are arranged in coaxial relationship inside of the drum the axis of rotation of which is thus coinciding with the longitudinal axis of the rear steering drag rods and both aforesaid fingers carrying the roller portions forming one single finger extending through the double wall of the drum with the guide roller portion located near the free end of the finger.

18. A device according to claim 17, wherein the drive shaft comprises a worm portion meshing tangentially with a toothe wheel secured to the drum.

* * * * *

UNITED STATES PATENT AND TRADEMARK OFFICE
CERTIFICATE OF CORRECTION

PATENT NO. : 4,993,730
DATED : February 19, 1991
INVENTOR(S) : Lucien Galtier et al It is certified that error appears in the above-identified patent and that said Letters Patent is hereby corrected as shown below:

Title page, Item [73] Assignees: Automobiles Peugeout, Paris; to -- Automobiles Peugeot, Paris--.

Column 3, line 54 , change "FIG.11 to --FIG.12--.

Signed and Sealed this

Twenty-ninth Day of December, 1992

Attest:

DOUGLAS B. COMER

*Attesting Officer*  *Acting Commissioner of Patents and Trademarks*